Patented Aug. 4, 1931

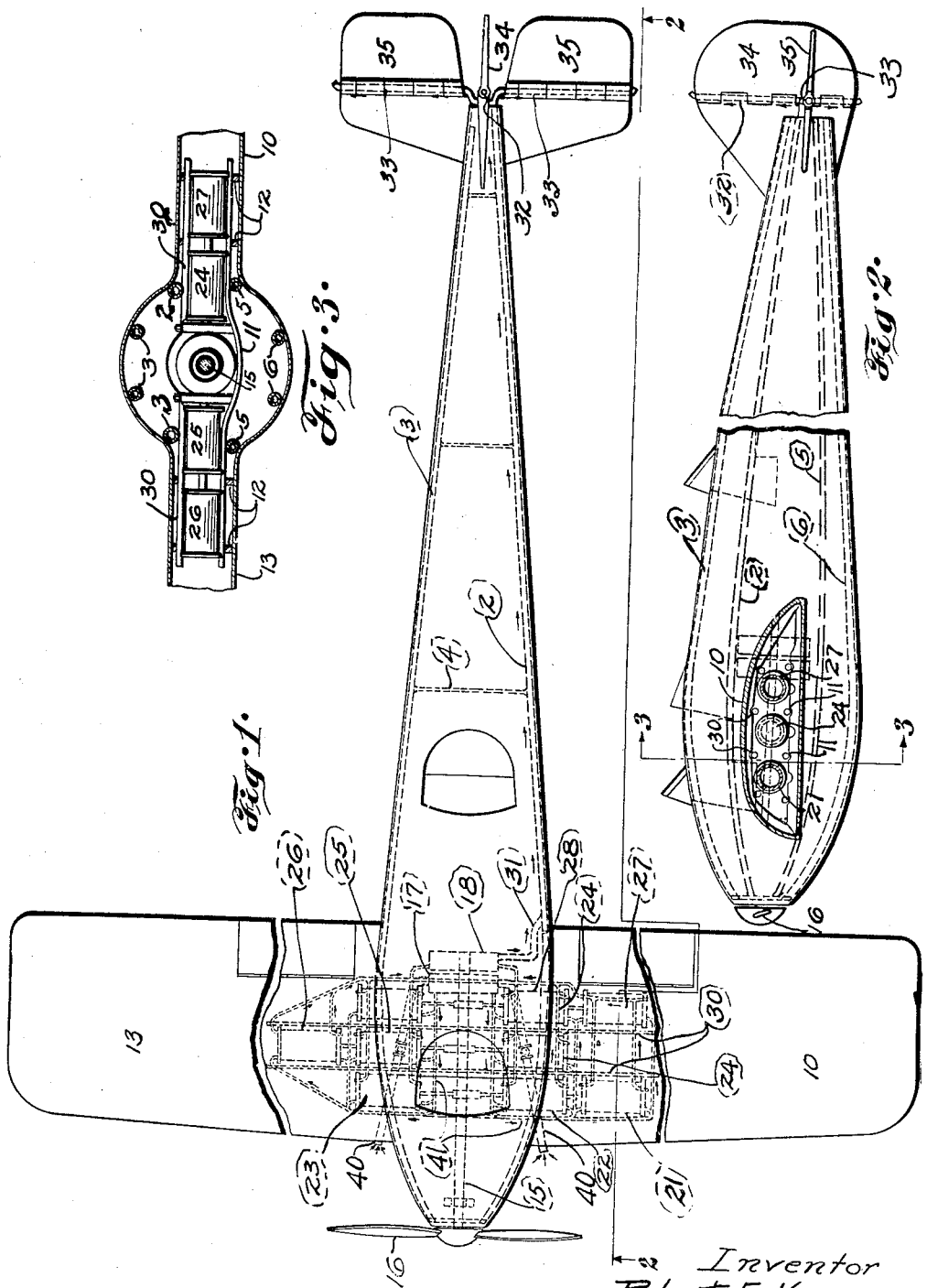

1,817,008

UNITED STATES PATENT OFFICE

ROBERT E. KRUG, OF GRANITE CITY, ILLINOIS

AEROPLANE

Application filed July 3, 1930. Serial No. 465,735.

My invention relates to aeroplanes and consists in a novel arrangement of fuselage, motor and motor scavenging and cooling means.

It has been customary to mount the motor of an aeroplane on the exterior of the fuselage, in the fuselage or on or in separate housing elements distinct from the fuselage. In the latter case, the motor housing elements have been either supported by or suspended from the wing of the aeroplane.

Only certain types of motors are adapted to be placed on the exterior of the fuselage where a motor creates great wind resistance and is constantly exposed to varying weather conditions. It is impractical to place horizontal motors or a plurality of any type of motors inside of the fuselage as a fuselage capable of housing such power plants would have to be so large as to seriously impair the efficiency of the aeroplane. It is undesirable to support on or suspend from the wing alone means for holding an aeroplane motor. A wing capable by itself of supporting a motor would have to be of too heavy construction for an aeroplane of maximum efficiency.

In my copending application, Serial No. 371,585, filed June 17, 1929, I disclose lateral fins mounted on the fuselage forward, rearward of, above or below the wings, with my motor mounted partly in the fuselage and partly in those fins. This arrangement overcomes certain objectionable features of the conventional ways of motor mounting.

But in the construction of an aeroplane, the center of support should coincide with the center of gravity in order to secure balance. Therefore if the motor is mounted forward of the wing, the fuselage of the plane should be very long back of the wing, whereas if the motor is mounted back of the wing, the fuselage of the plane should be very long forward of the wing. Thus, it is seen that the logical place to put an aeroplane driving motor is in vertical alinement with the wing.

But, as set forth above, there are certain disadvantages in putting the motor entirely in the wing itself. In order to obtain the advantages of placing my motor in vertical alinement with my wing and escape the disadvantages of placing it in the wing alone, I mount my motor partially in the fuselage and partially in the wing of my aeroplane.

One object of my invention is to produce a balanced ship without an unduly long fuselage.

Another object is to provide a fuselage and a wing mounted thereon so arranged and constructed that a horizontal engine may be mounted partially in the fuselage and partially in the wing.

Another object is to provide a motor so mounted in the fuselage and adapted to radiate heat to the surface of the wing to prevent the formation of ice thereon.

Another object is to provide a motor so mounted and having a scavenging system which aids the motor in keeping the wing surface and other parts of the aeroplane above freezing temperature.

Another object is to provide a fuselage framework consisting of tubes, one of which tubes is connected to the exhaust pipe of the motor and carries the gas to the rear of the fuselage where it is discharged through extensions adjacent to hinged rudder and elevator elements whereby heat from the exhaust may radiate to the joints of those elements to warm them above freezing temperature.

Other detailed objects of my invention will appear in the following specification and in the accompanying drawings in which Figure 1 is a top view partly in section of my novel aeroplane showing the mounting of a horizontal motor such as is disclosed in my copending application, Serial No. 385,114, filed August 12, 1929.

Figure 2 is a vertical section taken on the line 2—2 of Figure 1. Figure 3 is a vertical transverse section on line 3—3 of Figure 2.

I illustrate a monoplane having a fuselage 1 built on a framework of tubes 2, 3, 4, 5 and 6.

Mounted on the fuselage 1 are wings 10 and 13 projecting laterally from opposite sides of the fuselage. Running through the fuselage and into the wings on both sides of the fuselage are transverse motor supporting elements 11, and across the wings and lengthwise of the motor holding portion of the fuselage are longitudinal motor supporting elements 12. The elements 11 and 12 form a motor supporting framework.

Journaled in elements supported by the framework 11—12 in the fuselage is a propeller shaft 15 carrying a propeller 16 on the nose of the fuselage. The inner end of the shaft 15 drives a centrifugal intake pump 17 and a centrifugal exhaust pump 18.

Mounted on the framework 11—12 partly in the fuselage and partly in the wings 10 and 13 is a horizontal motor adapted to rotate the shaft 15. The cylinders of the motor are preferably arranged to lie in rows of three cylinders in each row, two cylinders of each row being on one side of the shaft 15 and one cylinder being on the opposite side of the shaft 15. For example, cylinder 21 is wholly within wing 10 while cylinders 22 and 23 are enclosed partly by the wings 10 and 13 and partly by the fuselage 1. The next row has one cylinder 24 on the same side of the shaft as cylinders 21 and 22, and two cylinders 25 and 26 on the same side of the shaft as a cylinder 23, cylinders 24 and 25 being enclosed partly by the wings 10 and 13 and partly by the fuselage 1 and cylinder 26 being enclosed by the wing 13 alone. In the third row, cylinders 27, 28 and 29 are arranged and enclosed as are the cylinders 21, 22 and 23 in the first row.

The motor when running radiates heat which prevents the formation of ice on the surface of the wings. This function of the motor is aided by the exhaust pipes 30 extending between the cylinders near the surface of the wings and leading from the motor to the exhaust pump, from which a pipe 31 leads to the tube 2, which carries the exhaust gas to vertical and lateral pipes 32 and 33, respectively, leading from the tube 2 at the tail end of the fuselage. Adjacent to pipe 32 is a rudder 34 and adjacent to the pipe 33 are elevators 35. Preferably the rudder and elevators are hinged on pipes 32 and 33, respectively, although this feature is not essential. Heat radiating from pipes 32 and 33 will warm the rudder and elevator hinge joints above freezing temperature and facilitate their operation.

As an aid to the efficient operation of the motor and as a means for carrying the hot exhaust gas through the motor, out through the fuselage and finally through the vertical and lateral pipes at the tail of the ship at a rate of speed that will allow the wings, cabin portion of the fuselage, and rudder and elevator joints to be kept at the proper temperature, particularly in hot weather, my device is equipped with a motor scavenging system. This system comprises air inlet pipes 40, leading from in front of the wings to the intake pump 17, and air conducting pipes 41, leading from the air intake pump 17 to the different cylinders of the motor, and the above mentioned exhaust pipes 30, leading from the cylinders to the exhaust pump 18. Explanation of the scavenging system from the time the air leaves the the intake pump to the time the exhaust gas and cylinder cooling air reaches the exhaust pump may be found in my copending application, Serial No. 385,114, filed August 12, 1929. The operation of the system is such that, as the motor operates, the pump 17 draws cool air from the propeller stream in front of the wings through the pipes 40 and forces the air into the different cylinders, expelling the hot exhaust gas out of the cylinders and forcing through the same a cooling draught of air which gas and air then passes through the exhaust pipes 30 into the exhaust pump 18 and out through the pipe 31 into tube 2 and is finally discharged from the pipes 32 and 33. The exhaust gas radiates heat from the exhaust pipes, the tube 2 and, finally, the extension pipes 32 and 33, and thereby warms the wings, the fuselage in which the pilot and passengers are carried, and the rudder and elevator joints.

While I have shown my invention applied to a monoplane, it may as readily be applied to a wing of a multi-wing plane.

Though I have shown a horizontal motor unit of the type disclosed in my copending application, Serial No. 385,114, enclosed in my wings and fuselage motor carrying compartment, it is obvious that other types of motors might be substituted therefor or that a plurality of motors could be used without departing from the spirit of my invention and I contemplate the exclusive use of such variations in the details of my construction and all other variations that come within the scope of my claims.

I claim:

1. In combination, an aeroplane fuselage, a transversely extending wing on said fuselage having upper and lower walls, said walls converging at their forward ends to provide an edge extending transversely of the fuselage, and a motor enclosed in part in said wing and in part in said fuselage.

2. In combination, an aeroplane fuselage, wings extending from opposite sides thereof, a propeller shaft mounted in said fuselage, a motor including at least two horizontally disposed cylinders with their axes alined and mounted in said wings on both sides of said fuselage.

3. In combination, an aeroplane fuselage, a wing mounted thereon, a propeller shaft mounted in said fuselage, a motor including at least two horizontally disposed cylinders housed in said wing and fuselage on one side of said propeller shaft.

4. In combination, an aeroplane fuselage, wings mounted thereon and forming therewith a chamber wider than said fuselage, a motor housed in said fuselage and wings, a motor shaft mounted in said fuselage, the cylinders of said motor being disposed horizontally in opposed positions in a plurality of rows of three cylinders in each row and arranged perpendicularly to the shaft, said rows alternatively having one cylinder on one side of the shaft and two on the opposing side of the shaft and two on the first mentioned side of the shaft and one on the second mentioned side of the shaft, at least a part of said cylinders being contained in the wing formed portion of said chamber.

5. In combination, an aeroplane fuselage, a wing mounted thereon, and motor supporting elements in said fuselage and wing, said fuselage and wing being adapted to cooperate to enclose an aeroplane driving motor.

6. In combination, an aeroplane fuselage, a wing mounted thereon, and a motor supporting framing comprising transverse members extending through said fuselage into said wing, said fuselage and wing being large enough to enclose an aeroplane driving motor mounted on said motor supporting framing.

7. In combination in an aeroplane, a fuselage framework, a motor, said fuselage framework including a tube connected to the exhaust pipe of said motor and extending lengthwise of said fuselage, a lateral extension from the rear end of said tube, and hinged elevators adjacent to said extension, whereby said pipe and extension conducts exhaust gas from the motor rearwardly and discharges the same at the tail of the aeroplane to warm the elevator joints.

8. In combination in an aeroplane, a fuselage framework, a motor, said fuselage framework including a tube connected to the exhaust pipe of said motor and extending lengthwise of said fuselage, and a hinged rudder adjacent to said extension, whereby said pipe and extension conducts exhaust gas from the motor rearwardly and discharges the same at the tail of the aeroplane to warm the rudder joint.

9. In combination in an aeroplane, a fuselage framework, a motor, said fuselage framework including a tube connected to the exhaust pipe of said motor and extending lengthwise of said fuselage, a perpendicular extension from the rear end of said tube, and a hinged direction control element adjacent to said extension, whereby said tube and extension function as a conduit for conducting exhaust gas from the motor rearwardly and utilizing the heat thereof to warm the control element joint.

10. In combination in an aeroplane, a fuselage framework, and a motor, said fuselage framework including a tube connected to the exhaust pipe of said motor and forming a structural element of the aeroplane and means for conducting exhaust gas from said motor to the rear of the fuselage and there discharging it.

11. In combination in an aeroplane, a fuselage framework, a motor, said fuselage framework including a tube extending lengthwise of the fuselage, a conduit from the exhaust pipe of said motor to said tube, lateral and vertical extensions from the rear end of said tube, a hinged rudder adjacent to said vertical extension, and hinged elevators adjacent to said lateral extensions, whereby said tube and extensions function as main structural elements of the aeroplane and as a series of conduits for conducting exhaust gas from the motor rearwardly and discharging the same at the tail of the aeroplane, the heat from the exhaust gas being adapted to radiate from said extensions to warm the rudder and elevator joints.

12. In combination in an aeroplane, a fuselage, a wing mounted thereon, a motor enclosed partly by said fuselage and partly by said wing, exhaust pipes extending from said motor laterally and longitudinally of substantial portions of said wing and near the surface thereof, whereby heat radiated from said pipes and motor is adapted to prevent the formation of ice on said wing.

13. In combination in an aeroplane, a fuselage, a wing mounted thereon, and a motor enclosed partly by said fuselage and partly by said wing, said motor being arranged to radiate heat to a substantial surface of said wing whereby the formation of ice on said wing is prevented.

14. In combination in an aeroplane, a fuselage, a wing mounted thereon, a motor enclosed partly by said fuselage and partly by said wing, a tube extending longitudinally of said fuselage and having an outlet at the rear of said fuselage, means for admitting air into said motor, and exhaust pipes extending from said motor laterally and longitudinally of substantial portions of said wing and near the surface thereof, said pipes being connected to said tube, whereby hot air and exhaust gas enters said pipes and cooperates with heat radiated from said motor to warm the surface of said wing to prevent the formation of ice on said wing, and whereby said air and gas is conducted by way of said tube to the rear of said fuselage and there discharged.

15. In combination in an aeroplane, a fuselage, a hollow wing mounted thereon, a propeller shaft mounted in said fuselage, a motor comprising a plurality of horizontally disposed cylinders some of which are mounted wholly in said wing while others are mounted partly in said fuselage and partly in said wing, said motor being adapted to rotate said shaft and to radiate heat to prevent the formation of ice on said wing.

16. In combination in an aeroplane, a fuselage, a wing mounted thereon, a propeller shaft mounted in said fuselage, a motor enclosed partly in said wing and partly in said fuselage, an intake pump driven by said shaft, an air inlet pipe leading from the front of said wing to said intake pump, an air conducting system leading from said intake pump to said motor, an exhaust pump driven by said shaft, a system of exhaust pipes leading from said motor to said exhaust pump, a tube extending lengthwise of said fuselage, extensions from the rear end of said tube, hinged direction control elements adjacent to said extensions, and a conduit leading from said exhaust pump to said tube, said motor being adapted to radiate heat to prevent the formation of ice on said wing and to rotate said shaft and thereby cause said pumps to scavenge and cool said motor, hot air and exhaust gas from said exhaust pump being forced through said tube and out through said extensions to warm the joints of said control elements.

17. In combination in an aeroplane, a fuselage, an enclosed hollow wing mounted thereon, a propeller shaft mounted in said fuselage, a motor enclosed partly in said wing and partly in said fuselage, an intake pump, an air inlet pipe leading from the front of said wing to said intake pump, an air conducting system leading from said intake pump to said motor, an exhaust pump, a system of exhaust pipes leading from said motor to said exhaust pump, said motor and pumping system being arranged to radiate heat to prevent the formation of ice on said wing and other critical parts of the aeroplane remote from said motor.

18. In combination in an aeroplane, a fuselage, a wing mounted thereon, a motor comprising a plurality of horizontal cylinders, said motor being enclosed partly by said fuselage and partly by said wing, an intake pump, an air inlet conduit leading from the front of said wing to said intake pump, an air conducting system leading from said intake pump to each of said cylinders whereby air is pumped through said cylinders cooling the same, an exhaust pump, a system of exhaust pipes leading from each of said cylinders and extending laterally and longitudinally of substantial portions of said wing and near the surface thereof and into said exhaust pump, an exhaust pipe leading from said pump, a tube extending longitudinally of said fuselage, said tube being connected to said exhaust pipe leading from said exhaust pump and having an outlet at the rear of said fuselage, whereby exhaust gas pumped out of said cylinders into said exhaust pipes causes heat to radiate from said pipes to the surface of said wing, said gas being thereafter conducted by said tube to the rear of said fuselage and there discharged.

19. In combination in an aeroplane, a tubular element at the rear of the aeroplane fuselage, a control member having straps surrounding said tubular element to form a hinge for said member, and means for discharging exhaust from the aeroplane engine through said tubular element.

In testimony whereof I hereunto affix my signature this 25th day of June, 1930.

ROBERT E. KRUG.